May 27, 1958 J. M. MacLEAN 2,836,414
SPRING ASSEMBLY
Filed April 12. 1954
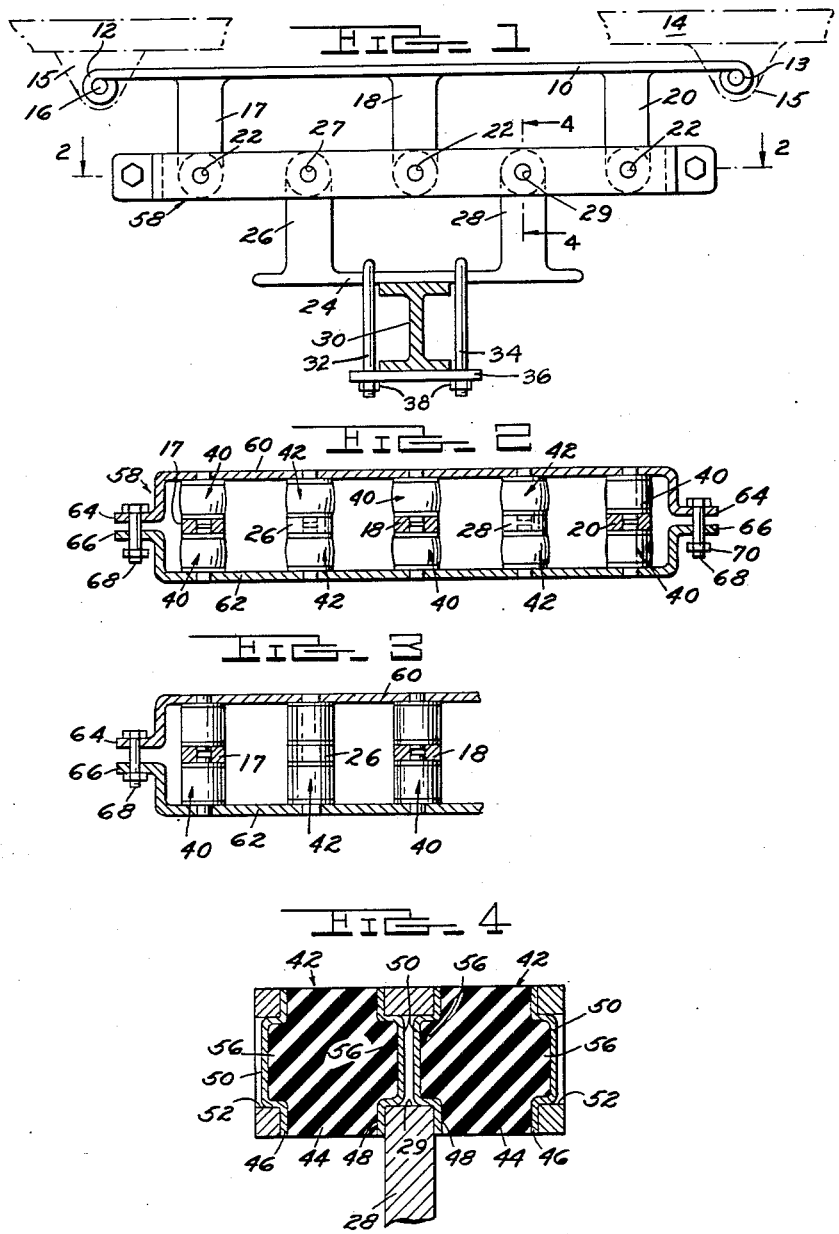
INVENTOR.
JAMES MATTHEW MAC LEAN
BY
Burton & Parker
ATTORNEYS

United States Patent Office 2,836,414
Patented May 27, 1958

2,836,414

SPRING ASSEMBLY

James Matthew MacLean, Windsor, Ontario, Canada; Florence Butler MacLean, executrix of said James M. MacLean, deceased Application April 12, 1954, Serial No. 422,621

6 Claims. (Cl. 267—63)

This invention relates to springs and particularly to railroad or automotive vehicle springs, and is intended as a substitute for the conventional leaf or coil type springs.

The invention is embodied in a spring structure including an upper support adapted to be fastened to the frame of the vehicle, which support is provided with linearly spaced apart depending stub portions. A lower support, adapted to be fastened to the axle of the vehicle, is provided with upwardly extending linearly spaced apart stub portions. The supports are disposed in such proximity and linear relationship, that the stubs of one support are interposed between the stubs of the other support and in alignment therewith. A floating, clamping band extends linearly of the supports in spaced relation therebetween and overlies the opposite sides of the stubs. A plurality of rubber blocks, held under compression between the band and the stubs, permit limited relative movement between the band and stubs and absorb shock forces therebetween.

An object of the invention is the provision of a spring assembly which is strong, durable, requires little or no maintenance, and is inexpensive to manufacture.

Another object of the invention is the provision of a spring structure adapted to replace the conventional leaf or coil type springs in road or railroad vehicles.

Another object is the provision in a spring structure of a plurality of rubber blocks held under compression and through which extend the lines of shear between the vehicle frame and the axle, with the resiliency of the blocks under compression absorbing shocks between the frame and axle and permitting a limited flexibility therebetween.

Another object of the invention is the provision in a spring structure of the above-mentioned character, of a floating clamping member which extends and is disposed within the space between the vehicle frame and the axle, and ties together under compression a plurality of rubber blocks, some of which are attached to a support coupled with the frame and the remainder of which are attached to a support coupled with the axle, with the band holding the blocks in spaced apart relation and transmitting the opposing forces of the frame and axle to, and distributing such forces among, the rubber blocks.

Other objects, advantages, and meritorious features will more fully appear from the specification, claims, and accompanying drawing, wherein:

Fig. 1 is a side elevation of the spring assembly as it is coupled to the frame and the axle of a vehicle;

Fig. 2 is a cross-sectional view taken on the line 2—2 of Fig. 1 showing the clamping band compressing the blocks;

Fig. 3 is a fragmentary view of one end of the structure shown in Fig. 2 with the clamping band released so that the blocks are not under compression; and Fig. 4 is a cross-sectional view taken on the line 4—4 of Fig. 1.

A spring structure embodying the invention is shown in Fig. 1.

Such structure is provided with a rigid upper support 10 formed of a steel bar or the like, and shown as being flat and exhibiting at opposite ends the eyes 12 and 13 which are adapted to be coupled to the frame 14 of the vehicle by means of the brackets 15 and bolts 16. Formed integrally with, or secured to the support in any convenient manner, as by welding, are the linearly spaced apart, depending stubs 17, 18, and 20. Each stub is generally rectangular in cross section as shown in Fig. 2, and is provided adjacent its free end with the aperture 22. While three stubs have been shown depending from the upper support, more or less than this number is also within the scope of the invention. The lower support 24, formed of a flat steel bar or the like, exhibits a pair of linearly spaced apart upwardly extending stubs 26 and 28 which may be formed integrally with the lower support or may be secured thereto in any convenient manner, as by welding. The lower support is spaced from the upper support and disposed parallel thereto. Apertures 27 and 29 extend through the free ends of the stubs 26 and 28. The vehicle axle 30, shown as being I-shaped in cross section, is adapted to abut the underside of the lower support, to be held thereagainst by a pair of U bolts 32 and 34, whose bites extend over the lower support, and whose threaded ends extend through the plate 36. Nuts 38 tension the axle against the support.

As shown in Figs. 2, 3, and 4, disposed on each side of the stubs, and aligned with the apertures therein, are the rubber blocks 40 and 42. Blocks 40 overlie the sides of the stubs 17, 18, and 20, which depend from the upper support, and the blocks 42 overlie the sides of the stubs 26 and 28 which extend upwardly from the lower support. Structurally the blocks 40 and 42 are similar, but differ in relative proportions as hereinafter described. The structural description of blocks 42 will suffice for the description of blocks 40.

Blocks 42, shown particularly in Fig. 4, are generally cylindrically shaped, and comprise the rubber insert 44 which is bonded between the opposed similarly shaped plates 46 and 48. The plates are provided with annular hollow bosses 50 which are adapted to be received within annular apertures 52 and 29 formed in adjacent overlying structural members of the spring assembly. The rubber inserts 44 exhibit annular bosses 56 which are received within the bosses 50 and are adapted to, in addition to the bonding of the inserts to the plates, secure in fixed relation the plates with the inserts. As will be noted in Fig. 4, the blocks overlie opposite faces of the stub 28 with the bosses 50 received within the aperture 29 thereof.

A floating clamping band assembly 58, shown in the drawings, is adapted to extend longitudinally between the upper and lower supports spaced therefrom. The band assembly is formed of steel or the like and comprises a pair of complementally shaped members 60 and 62, which are generally U shaped as shown in Figs. 2 and 3. The ends of the members 60 and 62 are provided with ear portions 64 and 66, which are apertured and adapted to receive the bolts 68 provided with the nuts 70. Each of the members is similarly apertured at spaced longitudinal intervals to receive the annular bosses 50 of the blocks. Such apertures are indicated in Fig. 4 as 52.

In Fig. 3 the members 60 and 62 of the floating clamping band assembly are in the released position with the rubber blocks in an uncompressed condition. Fig. 2 shows the assembly with the members 60 and 62 of the clamping band tightened, by means of the bolts 68 and nuts 70, toward each other with the rubber blocks under compression and slightly deformed radially between the members 60 and 62 and the stubs of the upper and lower supports. When in the compressed condition shown in Fig. 2, the cylindrical rubber blocks, or what may be termed rubber shear pads, have an axial dimension substantially one-half the diameter of the blocks. The cross-sectional shear area of the blocks 42, which are coupled with the stubs 26 and 28, equal substantially the cross-sectional shear area of the blocks 40 connected to the stubs 17, 18 and 20. This equalization of the cross-sectional shear area of the blocks connected to the lower support and the blocks connected to the upper support is to ensure substantial equality of resistance to distribution of shear forces among all the blocks. In other words, the four blocks 42 will withstand the same shear force that is distributed among the six blocks 40.

It may be appreciated that upon spacing the stubs of the upper and lower supports different distances apart than that shown in the drawings, and by providing only two stubs on the upper support instead of three, a different structure may be designed but such will embody the invention herein disclosed. In the event that an equal number of stubs are attached to the upper and lower supports, such as immediately above mentioned, the cross-sectional shear area of each block in such structure will be equal to the cross-sectional area of each of the other blocks.

The rubber blocks 40 and 42 are distorted by the compression of the floating members as the bolts 68 are tightened by the nuts 70. This compression is such that the distortion produced thereby is sufficient to absorb substantially all of the distortion that will result from relative movement between the two supports during travel of the vehicle. As a result of this fact, the rubber blocks are not destructively deteriorated and are not torn loose from the plates and the spring structure is enabled to perform its useful function over a long period of time. The rubber used in the blocks possesses the desired resilient character and strength and is long wearing.

What I claim is:

1. A spring structure for vehicles having a frame and an axle comprising, in combination: an upper support adapted to be coupled with the frame of the vehicle, a lower support disposed in spaced-apart relation below the upper support and adapted to be coupled with the axle of the vehicle, one of said supports provided with a stub extending toward the opposite support, the other one of said supports provided with a pair of spaced apart stubs extending toward the opposite support and disposed on opposite sides of the stub thereof, a rubber block secured to the end of the opposite sides of each stub, a floating compression assembly spaced between the supports and including a pair of members disposed on opposite sides of the stubs and coupled with said blocks, and releasable tensioning means extending between said members and coupled therewith and operable to adjustably and releasably tension the members toward each other and pre-compress the blocks between the stubs and the members of said floating member.

2. In a spring structure adapted to support the frame of a vehicle upon the axle thereof, a pair of superposed spaced apart supports with one support adapted to be coupled to the frame of the vehicle and the other adapted to be coupled with the axle of the vehicle, said supports provided with oppositely extended portions disposed in spaced apart relation, a floating assembly disposed in spaced relation between the supports and having oppositely disposed members overlying opposite sides of said extended portions, a plurality of rubber blocks positioned between said portions and said members and coupled therewith for rotation, and means extending between said members of the floating assembly to adjustably and releasably tension the members toward each other to compress the blocks, whereby upon release of said means the blocks may be rotated to different positions and said means retightened to re-compress the blocks between said oppositely extended portions and said members.

3. In a spring structure adapted to support the frame of a vehicle upon the axle thereof, a pair of superposed spaced apart supports with one support adapted to be coupled to the frame of the vehicle and the other adapted to be coupled with the axle of the vehicle, said supports provided with oppositely extended portions disposed in spaced apart relation, a floating assembly disposed in spaced relation between the supports and having oppositely disposed members overlying opposite sides of said extended portions, a plurality of rubber blocks positioned between said portions and said members, bearing plates secured to opposite faces of the blocks and provided with annular bosses received in annular recesses formed in said oppositely extended portions and in said members of the floating assembly and supporting the blocks for rotation between said portions and said members, and means tensioning the members of the floating assembly toward each other to compress the blocks.

4. In a spring structure adapted to support the frame of a vehicle upon the axle thereof, a pair of superposed spaced apart supports with one support adapted to be coupled to the frame of the vehicle and the other adapted to be coupled with the axle of the vehicle, said supports provided with oppositely extended portions disposed in spaced apart relation, a floating assembly disposed in spaced relation between the supports and having oppositely disposed members overlying opposite sides of said extended portions, a plurality of rubber blocks positioned between said portions and said members, annular bosses secured to opposite faces of the blocks and received in annular receses in said oppositely extended portions and in the members of the floating assembly and supporting the blocks between said portions and said members for rotation, and means coupling said members of the floating assembly together and holding them in determined spaced relation overlying said blocks and said oppositely extended portions.

5. A spring structure for vehicles having a frame and an axle comprising, in combination, an upper support adapted to be coupled with the frame and exhibiting a depending portion, a lower support adapted to be coupled with the axle and exhibiting an upwardly extending portion, said supports disposed in opposed relation with said portions in overlapping spaced apart relation, a floating assembly having oppositely disposed side members encircling said portions spaced therefrom and disposed in spaced-apart relation between the supports, adjustable tensioning means extending between the side members of the floating assembly and tensioning the side members toward each other and rubber elements secured to said portions and to the side members of the floating assembly and held compressed therebetween to couple the supports resiliently to the floating assembly.

6. A resilient suspension comprising, in combination: an upper support provided with a plurality of depending stubs disposed in spaced-apart relation along the support, a generally planar lower support normally disposed in spaced parallel relation below the upper support and provided with a plurality of upstanding stubs arranged in spaced-apart relation along the lower support and extending toward the upper support and arranged successively between the depending stubs of the upper support to provide alternately arranged depending and upstanding stubs, one of said supports to be coupled with a body to be resiliently suspended and the other support to be coupled with means from which the body is resiliently suspended, a floating assembly disposed between the upper and lower supports and encircling the alternately arranged stubs and including a pair of opposed members, means extending between and connected to the members at spaced locations offset along the members from the stubs to adjustably urge the members toward each other, and a rubber block secured to opposite sides of each stub and to said members opposite the stubs for rotatable adjustment and normally held compressed between the stubs and floating members to resist and absorb the shearing forces betwen the stubs and floating members.

References Cited in the file of this patent

UNITED STATES PATENTS

| | | |
|---|---|---|
| 1,930,067 | Tibbetts | Oct. 10, 1933 |
| 2,284,985 | Piron | June 2, 1942 |
| 2,305,814 | Schieferstein | Dec. 22, 1942 |
| 2,702,703 | Franceschetti | Feb. 22, 1955 |